(12) United States Patent
Bornoff et al.

(10) Patent No.: US 11,003,808 B2
(45) Date of Patent: May 11, 2021

(54) SUBTRACTIVE DESIGN FOR HEAT SINK IMPROVEMENT

(71) Applicant: Mentor Graphics Corporation, Wilsonville, OR (US)

(72) Inventors: Robin Bornoff, Herefordshire (GB); John Richard Wilson, Sunnyvale, CA (US); John Parry, Surrey (GB)

(73) Assignee: Siemens Industry Software Inc., Plano, TX (US)

( * ) Notice: Subject to any disclaimer, the term of this patent is extended or adjusted under 35 U.S.C. 154(b) by 297 days.

(21) Appl. No.: 15/277,607

(22) Filed: Sep. 27, 2016

(65) Prior Publication Data
US 2017/0091356 A1    Mar. 30, 2017

Related U.S. Application Data

(60) Provisional application No. 62/235,820, filed on Sep. 30, 2015.

(51) Int. Cl.
*G06F 17/50* (2006.01)
*G06F 30/20* (2020.01)
*G06F 119/08* (2020.01)

(52) U.S. Cl.
CPC .......... *G06F 30/20* (2020.01); *G06F 2119/08* (2020.01)

(58) Field of Classification Search
CPC .................................................. G06F 17/5009
USPC ......................................................... 703/21
See application file for complete search history.

(56) References Cited

U.S. PATENT DOCUMENTS

| | | | |
|---|---|---|---|
| 7,692,926 B2 * | 4/2010 | Henderson ............ | H01L 23/427 361/701 |
| 8,628,236 B2 * | 1/2014 | Bornoff .................... | G01K 3/14 374/29 |
| 8,650,521 B1 * | 2/2014 | Ordonez Ruiz ........ | G06F 30/23 716/110 |
| 10,386,127 B2 * | 8/2019 | Rush ........................ | F28F 7/02 |
| 2003/0062149 A1 * | 4/2003 | Goodson ................. | F28D 15/00 165/104.11 |
| 2004/0075747 A1 * | 4/2004 | Silverbrook ......... | B41J 2/14314 348/207.99 |
| 2006/0108098 A1 * | 5/2006 | Stevanovic ........... | H01L 23/473 165/80.4 |
| 2007/0283716 A1 * | 12/2007 | Marsala .................... | G06F 1/20 62/506 |

(Continued)

OTHER PUBLICATIONS

Bornoff et al. ("Heat Sink Design Optimization Using the Thermal Bottleneck Concept", IEEE, 2011, pp. 1-5).*
Waqar Ahmed Khan ("Modeling of Fluid Flow and Heat Transfer for Optimization of Pin-Fin Heat Sinks", University of Waterloo, 2004, pp. 1-318).*
Arularasan et al. ("CFD Analysis in a Heat Sink for Cooling of Electronic Devices", International Journal of The Computer, the Internet and Management vol. 16.No. 3 (Sep.-Dec. 2008) pp. 1-11).*

(Continued)

*Primary Examiner* — Iftekhar A Khan

(57) ABSTRACT

Aspects of the disclosed technology relate to techniques of improving heat sink designs based on systematic mass removal. A thermal simulation is performed to determine thermal property values for a heat sink design. The thermal property value of a portion of the heat sink design relates to the portion's contribution to thermal performance of the heat sink design. One or more portions of the heat sink design are selected based on the thermal property values and removed to generate a new heat sink design. The performing operation and the removing operation are repeated until one of one or more predetermined conditions is met.

16 Claims, 19 Drawing Sheets

(56) References Cited

U.S. PATENT DOCUMENTS

| | | | |
|---|---|---|---|
| 2008/0066888 A1* | 3/2008 | Tong | H01L 23/3677 165/80.3 |
| 2008/0193961 A1* | 8/2008 | Easley | B01D 39/00 435/29 |
| 2010/0102442 A1* | 4/2010 | Sung | H01L 23/3732 257/720 |
| 2010/0212656 A1* | 8/2010 | Qiu | F24S 20/20 126/618 |
| 2011/0056661 A1* | 3/2011 | Wojtowicz | H01L 21/4882 165/135 |
| 2011/0268147 A1* | 11/2011 | Bornoff | G01K 17/00 374/29 |
| 2012/0234524 A1* | 9/2012 | Fan | H01L 23/373 165/185 |
| 2012/0243180 A1* | 9/2012 | Lee | F28F 13/08 361/702 |
| 2014/0014308 A1* | 1/2014 | Wu | H05K 7/20409 165/185 |
| 2014/0090818 A1* | 4/2014 | Rosenfeld | H01L 23/473 165/109.1 |
| 2014/0277669 A1* | 9/2014 | Nardi | B23P 6/00 700/103 |
| 2015/0010874 A1* | 1/2015 | Ghazvini | F28D 21/0005 431/170 |
| 2015/0138723 A1* | 5/2015 | Shedd | F25B 25/00 361/679.47 |
| 2016/0224699 A1* | 8/2016 | Bornoff | G06F 1/20 |

OTHER PUBLICATIONS

Seri Lee ("Optimum Design and Selection of Heat Sinks", IEEE, 1995, pp. 48-54).*

Byron Blackmore ("creating PCB thermal conductivity maps using image processing", 2010, PCB, Thermal Conductivity, pp. 1-12) (Year: 2010).*

Kevin Joseph Renze ("Unstructured surface and volume decimation of tessellated domains", Iowa State University, 1995, 1-110) (Year: 1995).*

William R. Hamburgen ("Optimal Finned Heat Sinks",Digital Equipment Corporation, 1986, pp. 1-72) (Year: 1986).*

MentorGraphics Article ("FloTHERM® Optimizing Thermal Design of Electronics", 2010, pp. 1-7) (Year: 2010).*

Parry, J., Bornoff, R., Stehouwer, P., Driessen, L. and Stinstra, E., "Simulation-Based Design Optimisation Methodologies Applied to CFD", Proceedings of 19th SEMI-THERM Symposium, San Jose CA, Mar. 2003, pp. 8-13.

Bornoff, R., Parry, J., "An Additive Design Heatsink Geometry Topology Identification and Optimisation Algorithm", Proceedings of 31st SEMI-THERM Symposium, San Jose CA, Mar. 2015.

Bornoff, R., Blackmore, B., Parry, J., "Heat Sink Design Optimization Using the Thermal Bottleneck Concept", Proceedings of 27th SEMI-THERM Symposium, San Jose CA, Mar. 2011, pp. 76-80.

* cited by examiner

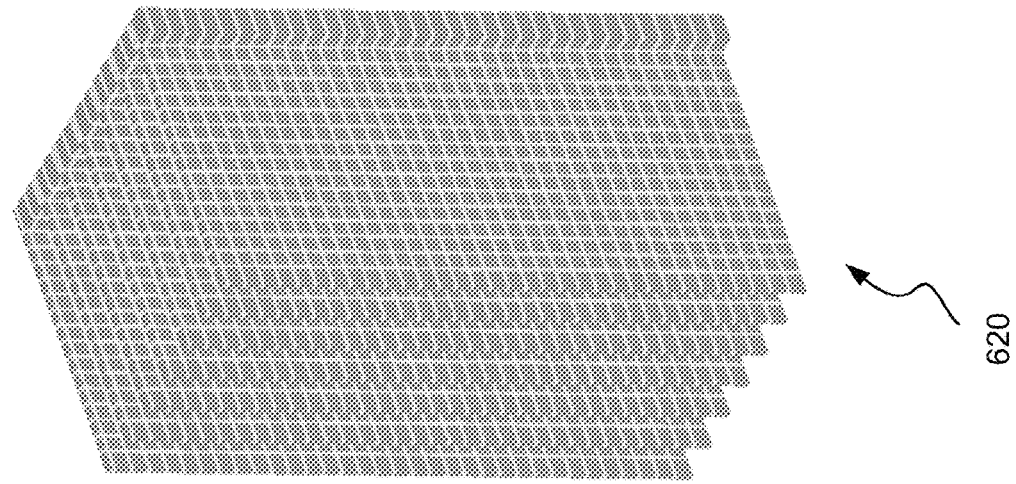
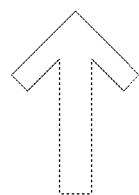
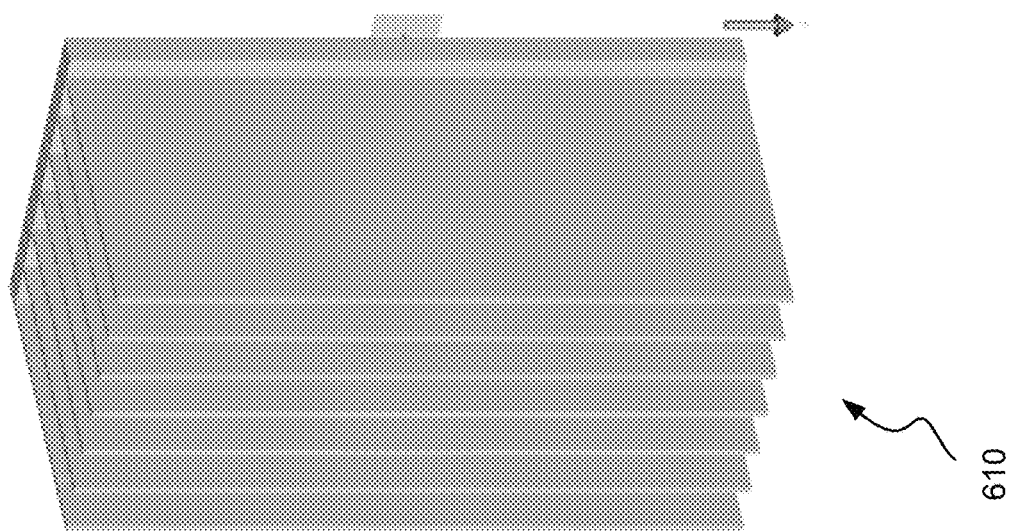
FIGURE 6

Natural Convection, outer fin @20% mass removed
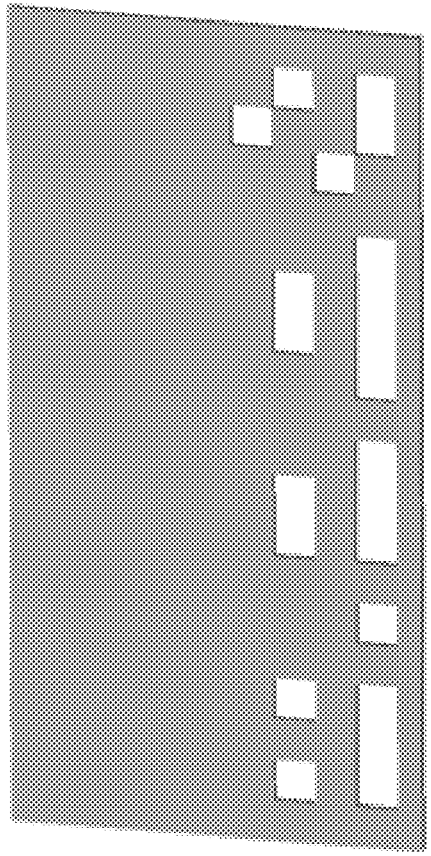
Forced Convection, @30% mass removed
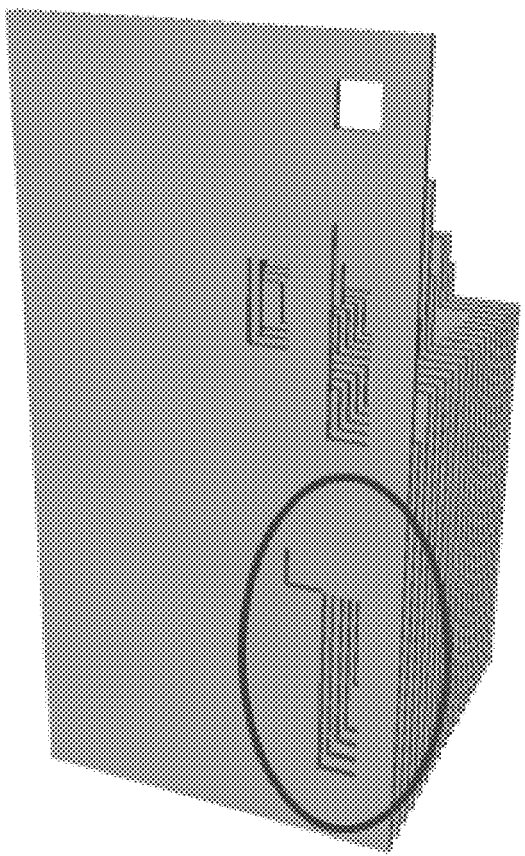
FIGURE 19

SUBTRACTIVE DESIGN FOR HEAT SINK IMPROVEMENT

RELATED APPLICATIONS

This application claims the benefit of U.S. Provisional Patent Application No. 62/234,820, filed on Sep. 30, 2015, and naming Robin Bornoff et al. as inventors, which application is incorporated entirely herein by reference.

FIELD OF THE DISCLOSED TECHNOLOGY

The present disclosed technology is directed to heat sink design. Various aspects of the disclosed technology may be particularly useful for applying a subtractive process to heat sink design.

BACKGROUND OF THE DISCLOSED TECHNOLOGY

Typical heat sink design involves balancing trade-offs between parameters such as heat spreading, heat sink mass, airflow bypass, and manufacturability. A typical optimization would include varying a small number of dimensional parameters of the heat sink and a temperature rise used as the objective cost function. A Computational Fluid Dynamics (CFD) simulation offers the opportunity to consider the spatial distribution of heat transfer effectiveness and, based on that, changes made to the geometry topology with the intention to further improve the design. This approach was described in a paper by John Parry et al., "Simulation-Based Design Optimisation Methodologies Applied to CFD", Proceedings of $19^{th}$ SEMI-THERM Symposium, San Jose Calif., March 2003, pp. 8-13, which is incorporated herein by reference.

An additive methodology to heat sink design has been developed, which was described in U.S. patent application Ser. No. 14/824,370, filed on Aug. 12, 2015, entitled "Additive Design Of Heat Sinks", and naming Robin Bornoff et al. as inventors, which application is incorporated entirely herein by reference. In one embodiment of the additive design approach, the heat sink fins were allowed to grow where the surface temperature was the highest, as part of an iterative design process. The heat sink topology evolved over a number of cycles until no further performance gains were achieved. It was observed that the heat sink grew as a tree-like structure from the center of the heat source. In another embodiment, this process was also applied to grow the heat sink where the thermal bottleneck value was largest, producing improved behavior compared to using surface temperature to drive the additive design process.

Thermal bottleneck distribution was also used to directly modify fin thickness of a pre-optimized heat sink, which was described in Robin Bornoff et al., "Heat Sink Design Optimization Using the Thermal Bottleneck Concept", Proceedings of 27th SEMI-THERM Symposium, San Jose, Calif., March 2011, pp. 76-80, which is incorporated herein by reference (referred to as the optimization paper). The thermal bottleneck values in each fin were noted and the fin thicknesses modified in an attempt to equalize the thermal bottleneck value in each fin, leading to a marked improvement in thermal performance.

Typical heat sink design includes base and fin thickness, fin height, and fin gap optimization. In situations where material cost or mass of the heat sink are also a design priority further optimization with respect to mass removal can be significant.

BRIEF SUMMARY OF THE DISCLOSED TECHNOLOGY

Aspects of the disclosed technology relate to techniques of improving heat sink designs based on systematic mass removal. In one aspect, there is a method comprising: performing a thermal simulation to determine thermal property values for a heat sink design, wherein the thermal property value of a portion of the heat sink design relates to the portion's contribution to thermal performance of the heat sink design; removing one or more portions of the heat sink design to generate a new heat sink design, wherein the one or more portions of the heat sink design are selected based on the thermal property values and contribute less to the thermal performance of the heat sink design than remaining portions of the heat sink design eligible to be removed; and repeating the performing operation and the removing operation until one of one or more predetermined conditions is met.

The one or more predetermined conditions may comprise a predetermined condition regarding a maximum percentage of the heat sink design that can be removed, a predetermined condition regarding thermal performance degradation, or both.

The thermal property values may be thermal bottleneck values, wherein the thermal property value is defined as a dot product of a heat flux vector and a temperature gradient vector. The thermal property values may also be heat flux values or temperature difference values.

The heat sink design may be divided into small tessellated portions, the thermal property value may be determined for each of the small tessellated portions, and the one or more portions may be one or more of the small tessellated portions.

The one or more portions may be selected only from certain portions of the heat sink design such as tops of fins and base of a heat sink design.

In another aspect, there are one or more computer-readable media storing computer-executable instructions for causing one or more processors to perform the above method.

In still another method, there is a system, comprising: one or more processors, the one or more processors programmed to perform the above method.

These and other features of the disclosed technology will be described in more detail below.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 6 illustrates an example of an unconstrained optimized heat sink design being divided into many small tessellated portions for subtractive design.

FIG. 19 illustrates an example of the formation of 'frame' fins due to an unrestricted subtractive design process.

DETAILED DESCRIPTION OF THE DISCLOSED TECHNOLOGY

Figure 1:
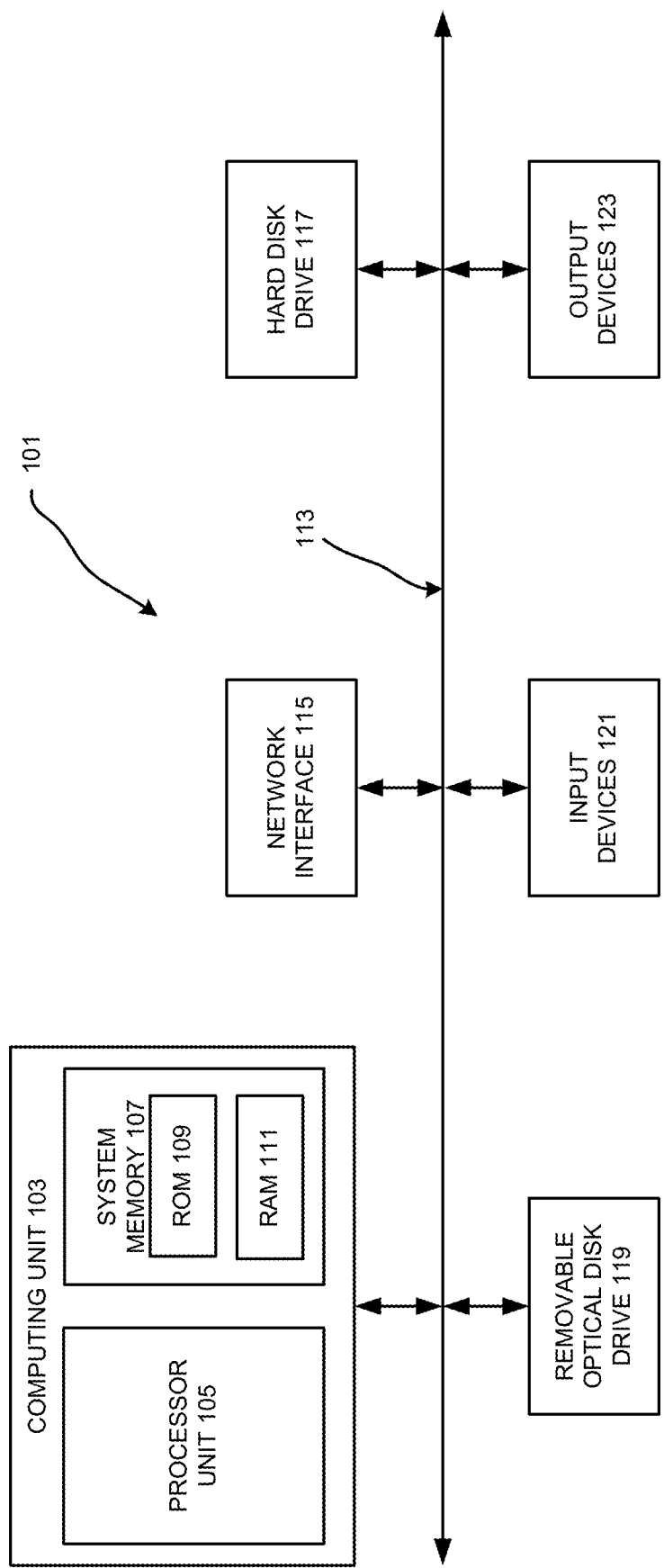
FIG. 1 illustrates an example of a programmable computer that may be used to implement a heat sink design tool or method according to various embodiments of the disclosed technology.

Aspects of the disclosed technology relate to techniques of optimizing heat sink design based on a subtractive design process. In the following description, numerous details are set forth for purpose of explanation. However, one of ordinary skill in the art will realize that the disclosed technology may be practiced without the use of these specific details. In other instances, well-known features have not been described in detail to avoid obscuring the present disclosed technology.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "perform," "simulate" and "remove" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate computational fluid dynamics ("CFD") software tool. Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language.

Any data produced from any of the disclosed methods can be stored on computer-readable media (e.g., tangible computer-readable media, such as one or more CDs, volatile memory components (such as DRAM or SRAM), or non-volatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked, and includes both direct connections or direct links and indirect connections or indirect links through one or more intermediate elements not affecting the intended operation of the circuit.

Exemplary Operating Environment

Various examples of the disclosed technology may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the disclosed technology may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the disclosed technology may be implemented using a multi-processor computer, a plurality of single and/or multiprocessor computers arranged into a network, or some combination of both.

Heat Sink Design Tool

Figure 2:
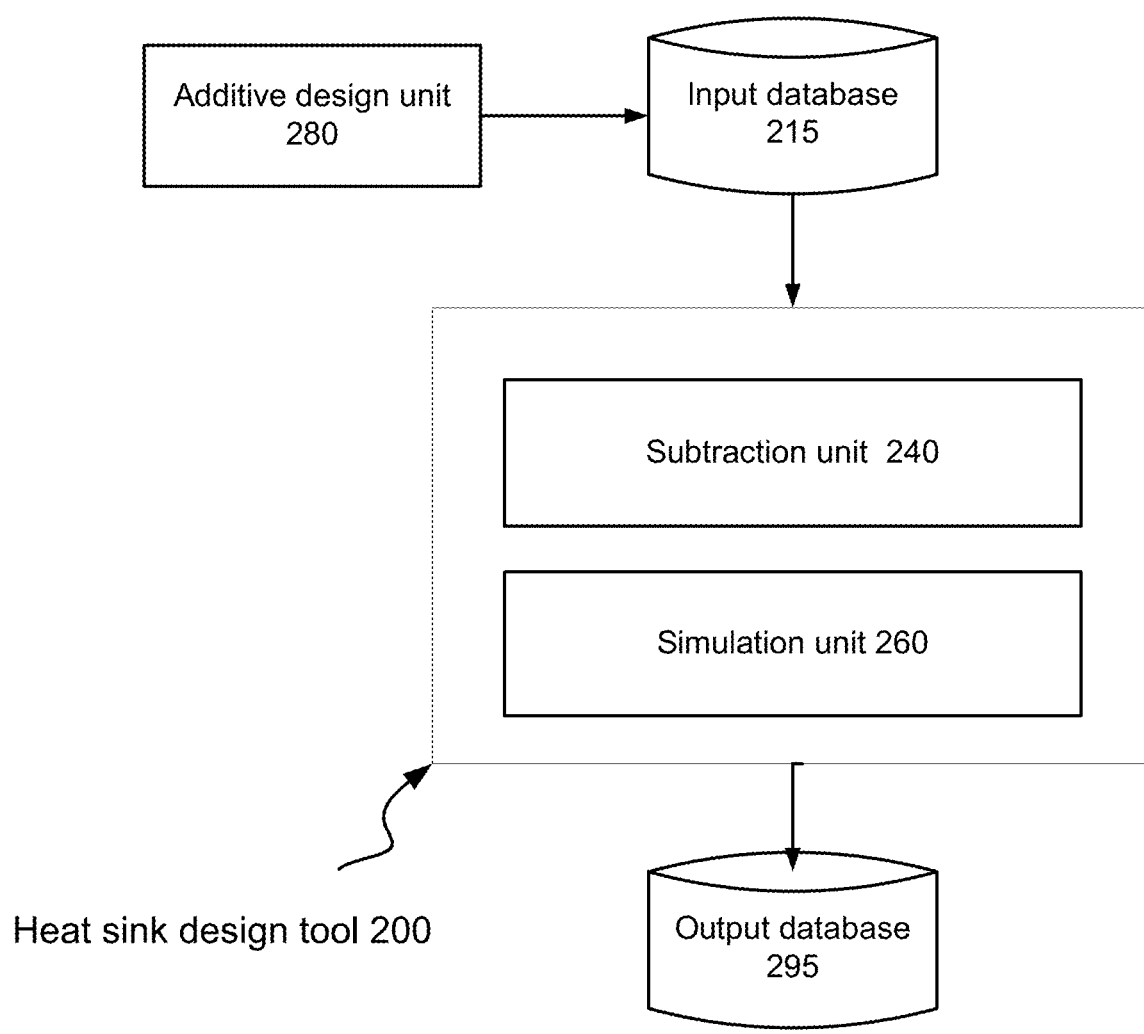
FIG. 2 illustrates a heat sink design tool according to various embodiments of the disclosed technology.

FIG. 2 illustrates an example of a heat sink design tool 200 that may be provided according to various embodiments of the disclosed technology. As seen in this figure, the heat sink design tool 200 includes a subtraction unit 240 and a simulation unit 260. Some implementations of the heat sink design tool 200 may cooperate with (or incorporate) one or more of an additive design unit 280, an input database 215 and an output database 295.

As will be discussed in more detail below, the heat sink design tool 200 receives from the database 215 or generates by itself a heat sink design. The heat sink design may be generated using a traditional method or by the additive design unit 280. The simulation unit 260 performs a thermal simulation to determine thermal property values of the heat sink design. The thermal property value of a portion of the heat sink design relates to the portion's contribution to thermal performance of the heat sink design. The subtraction unit 240 removes one or more portions of the heat sink design to generate a new heat sink design. The one or more portions of the heat sink design are selected based on the thermal property values and contribute less to the thermal performance of the heat sink design than remaining portions of the heat sink design eligible to be removed. The heat sink design tool 200 then decides whether to repeat the performing operation and the removing operation based on whether one of one or more predetermined conditions is met. One of the one or more predetermined conditions is maximum percentage of the heat sink design that can be removed. If the process is terminated, the final heat sink design may be stored in the database 295.

As previously noted, various examples of the disclosed technology may be implemented by one or more computing systems, such as the computing system illustrated in FIG. 1. Accordingly, one or more of the subtraction unit 240, the simulation unit 260 and the additive design unit 280 may be implemented by executing programming instructions on one or more processors in one or more computing systems, such as the computing system illustrated in FIG. 1. Correspondingly, some other embodiments of the disclosed technology may be implemented by software instructions, stored on a non-transitory computer-readable medium, for instructing one or more programmable computers/computer systems to perform the functions of one or more of the subtraction unit 240, the simulation unit 260 and the additive design unit 280. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the subtraction unit 240, the simulation unit 260 and the additive design unit 280 are shown as separate units in FIG. 2, a single computer (or a single processor within a master computer) or a single computer system may be used to implement all of these units at different times, or components of these units at different times.

With various examples of the disclosed technology, the input database 215 and the output database 295 may be implemented using any suitable computer readable storage device. That is, either of the input database 215 and the output database 295 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, punched media, holographic storage devices, or any other non-transitory storage medium that can be used to store desired information. While the input database 215 and the output database 295 are shown as separate units in FIG. 2, a single data storage medium may be used to implement some or all of these databases.

Subtractive Design Process for Heat Sink Improvement

Figure 3:
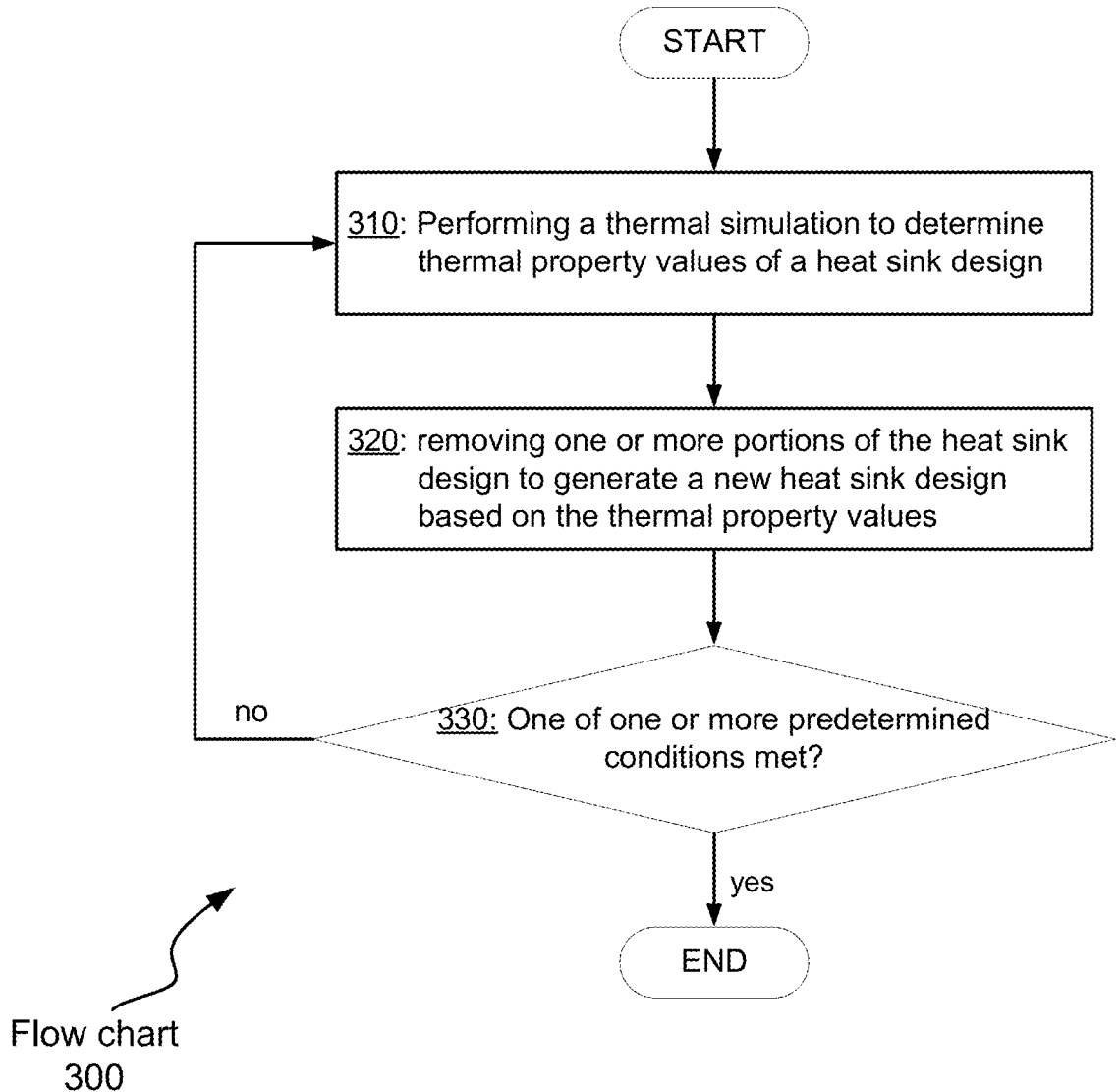
FIG. 3 illustrates a flowchart showing methods of employing a subtractive design process to optimize heat sink designs according to various embodiments of the disclosed technology.

FIG. 3 illustrates a flowchart 300 showing a subtractive design process that may be employed according to various embodiments of the disclosed technology. For ease of understanding, methods of subtractive design that may be employed according to various embodiments of the disclosed technology will be described with reference to the heat sink design tool 200 illustrated in FIG. 2 and the flowchart 300 illustrated in FIG. 3. It should be appreciated, however, that alternate implementations of a heat sink design tool may be used to perform the subtractive design methods illustrated by the flowchart 300 according to various embodiments of the disclosed technology. Likewise, the heat sink design tool 200 may be employed to perform other subtractive design methods according to various embodiments of the disclosed technology.

Figure 4:
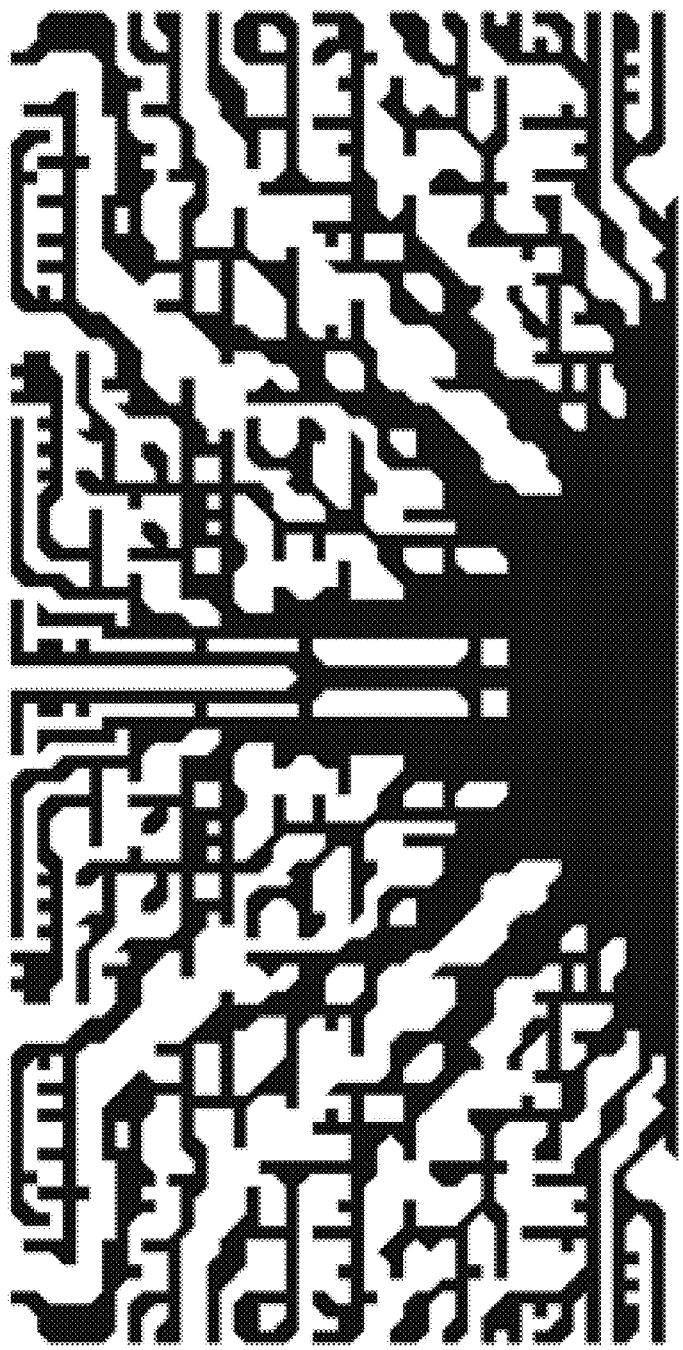
FIG. 4 illustrates of a heat sink design generated through an additive design process.
Figure 5:
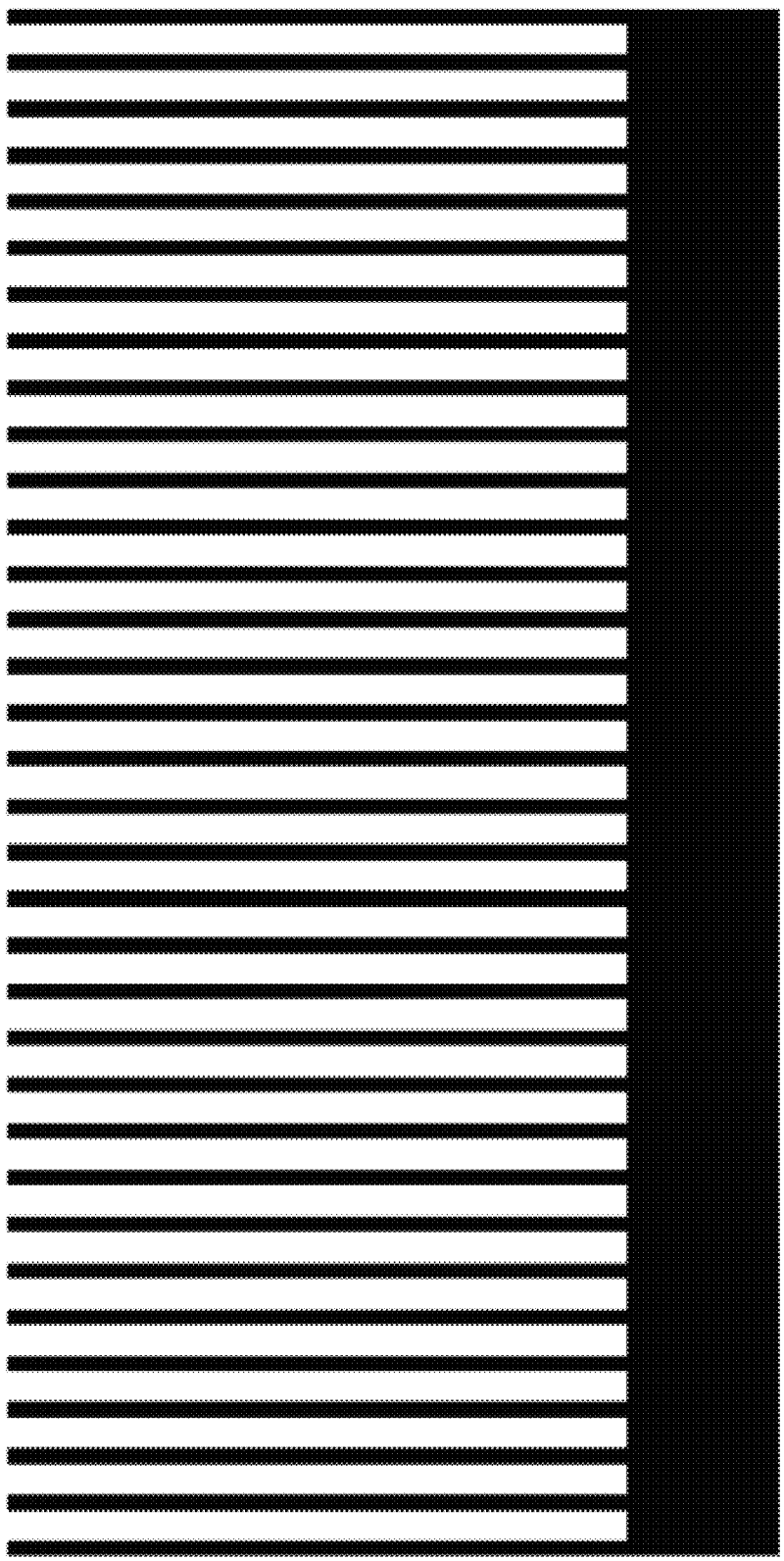
FIG. 5 illustrates of a heat sink design generated through a design optimization process based on the thermal bottleneck concept.

In operation 310 of the flowchart 300, the simulation unit 260 performs a thermal simulation to determine thermal property values of a heat sink design. The heat sink design may be generated by any approach such as the additive design approach described in the U.S. patent application Ser. No. 14/824,370. FIG. 4 illustrates an example of such a heat sink design. The heat sink design may also be one comprising an optimized plate fin extrusion with respect to base thickness, number of fins and fin height generated using, for example, the approach described in the optimization paper. FIG. 5 illustrates an example of such an optimized heat sink design.

Various implementations of the disclosed technology may use conventional thermal modeling software for the simulation. For example, the simulation unit 260 may be implemented by installing the FloTHERM® family of software products available from Mentor Graphics Corporation of Wilsonville, Oreg., or the ANSYS® Icepak® software product available from Ansys, Inc., of Canonsburg, Pa., in a computer according to various embodiments of the disclosed technology.

The thermal property values are determined for portions of the heat sink design. These portions may be considered as small tessellated portions of the heat sink design. FIG. 6 illustrates an example of an unconstrained optimized heat sink design being divided into many small tessellated portions. The thermal property value of a portion of the heat sink design can reflect the portion's contribution to the thermal performance of the heat sink design. In some embodiments of the disclosed technology, the smaller the thermal property value of a portion of the heat sink design, the less the portion contributing to the cooling ability of the heat sink. Accordingly, removing portions having relatively small thermal property values may not unduly affect the thermal performance of the heat sink design. The thermal performance may be measured by thermal resistance of the heat sink design.

The thermal bottleneck discussed in the U.S. patent application Ser. No. 14/824,370 can serve as the thermal property employed by the heat sink design tool 200. Heat flow can be defined in terms of a heat flow through a given cross sectional area. This measure is known as a heat flux. The presence of a heat flux vector will always result in a temperature gradient vector. The temperature gradient field is taken to be an indicator of conductive thermal resistance as, for a given heat flux, the greater the temperature gradient is the larger the thermal resistance will be.

The dimensionalized heat bottleneck value is the dot product of the above 2 vector quantities. At each point where there exists a heat flux vector and temperature gradient vector, the heat bottleneck value at that point is calculated as: Heat Flux magnitude (i.e. magnitude of the heat flux vector)×Temperature Gradient magnitude (i.e. magnitude of the temperature gradient vector)×|cos(θ)|, where θ is the angle between the heat flux vector and the temperature gradient vector.

The heat bottleneck value may be normalized by the maximum value of that variable in a simulation model, thus producing a range that always has a maximum value of 1 to facilitate results inspection and interpretation (i.e., 1 will always be the 'worst' local bottleneck in the design). Regions of the analysis that exhibit large heat bottleneck values can have one or more of three qualities: 1) a large value for heat flux, i.e., it will be on an existing heat transfer path of significance; 2) a large value of temperature gradient, i.e., there will be significant thermal resistance at that point; and 3) the heat flux and temperature gradient vectors will be aligned.

Therefore, locations that are on an existing heat transfer path and experience significant resistance to heat transfer will result in large thermal bottleneck values. Accordingly, portions of the heat sink design in these bottleneck locations make larger contributions to the cooling ability of the heat sink design than the rest portions.

Alternatively, the heat flux or the temperature gradient may serve as the thermal property employed by the heat sink design tool 200.

In operation 320 of the flowchart 300, the subtraction unit 240 removes one or more portions of the heat sink design to generate a new heat sink design based on the determined thermal property values. Removal of the heat sink mass, and related convective surface area, will usually lead to higher heat sink thermal resistance. The one or more portions of the heat sink design are selected to be the ones that contribute less to the thermal performance of the heat sink design than the remaining portions eligible to be removed. According to some embodiments of the disclosed technology, for example, the subtraction unit 240 selects a portion of the heat sink design that has the lowest thermal bottleneck value for removal.

The removal may be unrestrictive or restrictive. One example of restricted removal is the top surface removal: only portions from tops of fins and base are eligible to be removed.

In operation 330, the heat sink design tool 200 determines whether to repeat the performing operation 310 and the removing operation 320 based on one of one or more predetermined conditions is met. One of the one or more predetermined conditions is a maximum percentage of the heat sink design that can be removed. For example, the iterative process terminates when 30% of the heat sink design is removed.

Additionally or alternatively, the heat sink design tool 200 may determine whether to repeat the operations 310 and 320 based on a predetermined condition regarding thermal performance degradation. With some implementations of the disclosed technology, a maximum thermal resistance may be set. Once it is reached, the iterative process is terminated. After the termination, the heat sink design tool 200 may store the final heat sink design in the output database 295.

Figure 7:
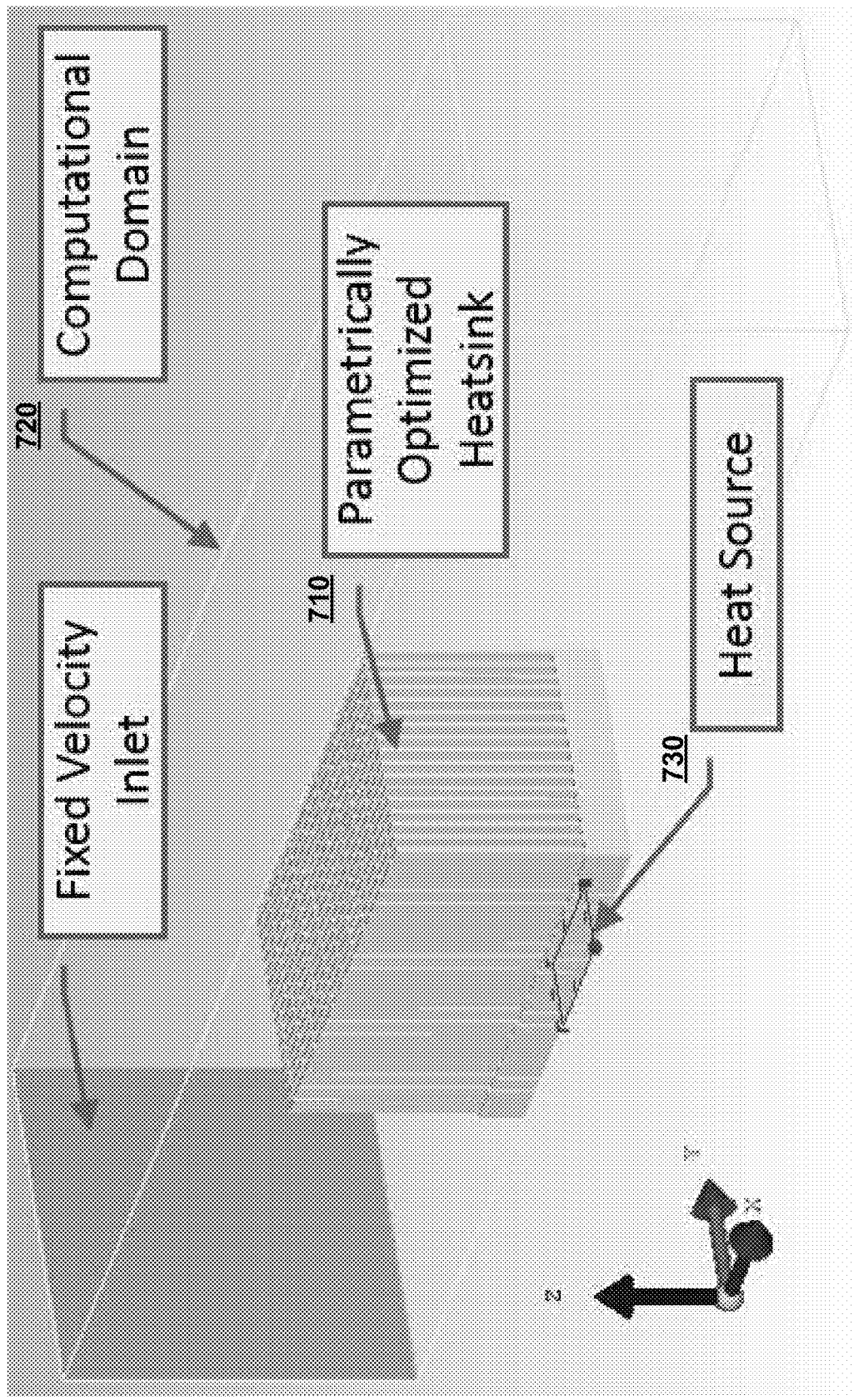
FIG. 7 illustrates an example of a parametrically optimized heat sink in a forced convection computational wind tunnel.

FIG. 7 illustrates a parametrically optimized heat sink 710 being placed in a forced convection computational wind tunnel 720. The heat sink design space is 100 mm×100 mm×50 mm with 25 mm of bypass on the top and each side of the heat sink 710. The heat sink 710 is assumed to have a thermal conductivity of 205 W/mK. A 30 mm×30 mm heat source 730 dissipates 200W at the center of the heat sink base. A FloTHERM tool by Mentor Graphics Corporation is used to simulate the heat sink. Symmetry is utilized so that only half the heat sink is simulated.

Initially, an unconstrained plate fin heat sink that filled the design space is placed in the numerical wind tunnel with an inlet air speed of 3 m/s (590.5 LFM) at a nominal temperature of 0° C. The thermal resistance of the heat sink is minimized considering the following design variants: base thickness, number of fins and fin height. A design of experiments is used to populate the design space followed by a gradient based sequential optimization approach to identify a thermal resistance cost function minima. The resulting optimized profile is shown in FIG. 5 and is found to have an $R_{th}$ of 0.231° C./W.

The heat sink design is then divided into 5 mm×5 mm×1 mm portions. An unrestricted mass removal process is executed, which removes mass from any subdivided volume in the heat sink (a portion) where the thermal bottleneck value is found to be smallest. The simulation was then repeated, with mass removed where the thermal bottleneck value is smallest in this slightly modified heat sink geometry. The process is repeated until 70% of the heat sink mass had been removed.

Figure 8:
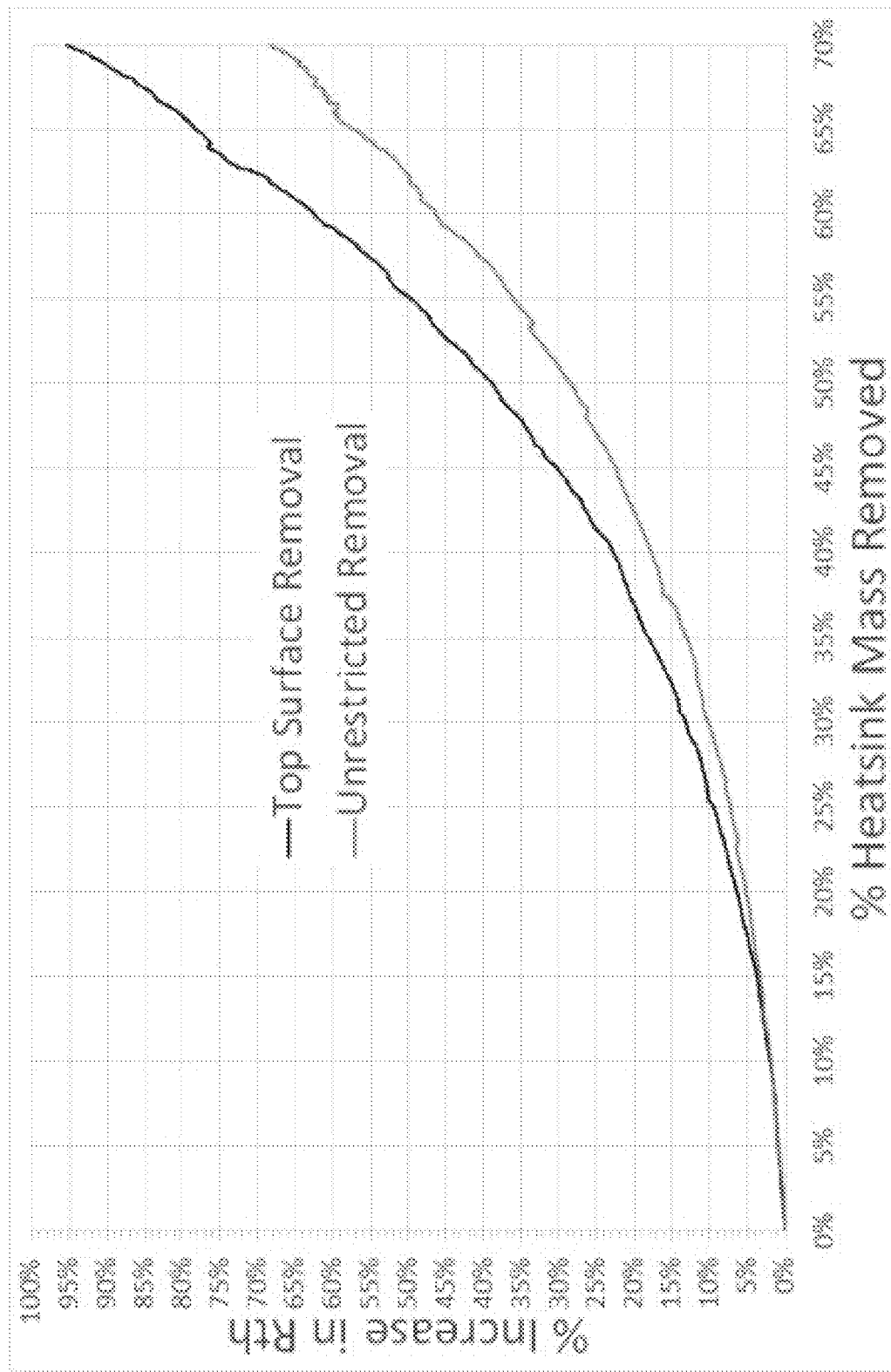
FIG. 8 illustrates an example of the relationship between the amount of removed heat sink mass and the resulting increase in thermal resistance ($R_{th}$) for a subtractive design process performed on the parametrically optimized heat sink shown in FIG. 5 in the forced convection computational wind tunnel shown in FIG. 7.

The top surface removal process follows the same methodology but with the added restriction, which allows only those subdivided heat sink portions that have a solid/fluid interface parallel to the base plane, i.e. the top of the fins/base to be considered for removal. The relationship between the amount of removed heat sink mass and the resulting increase in $R_{th}$ is shown in FIG. 8.

Figure 9:
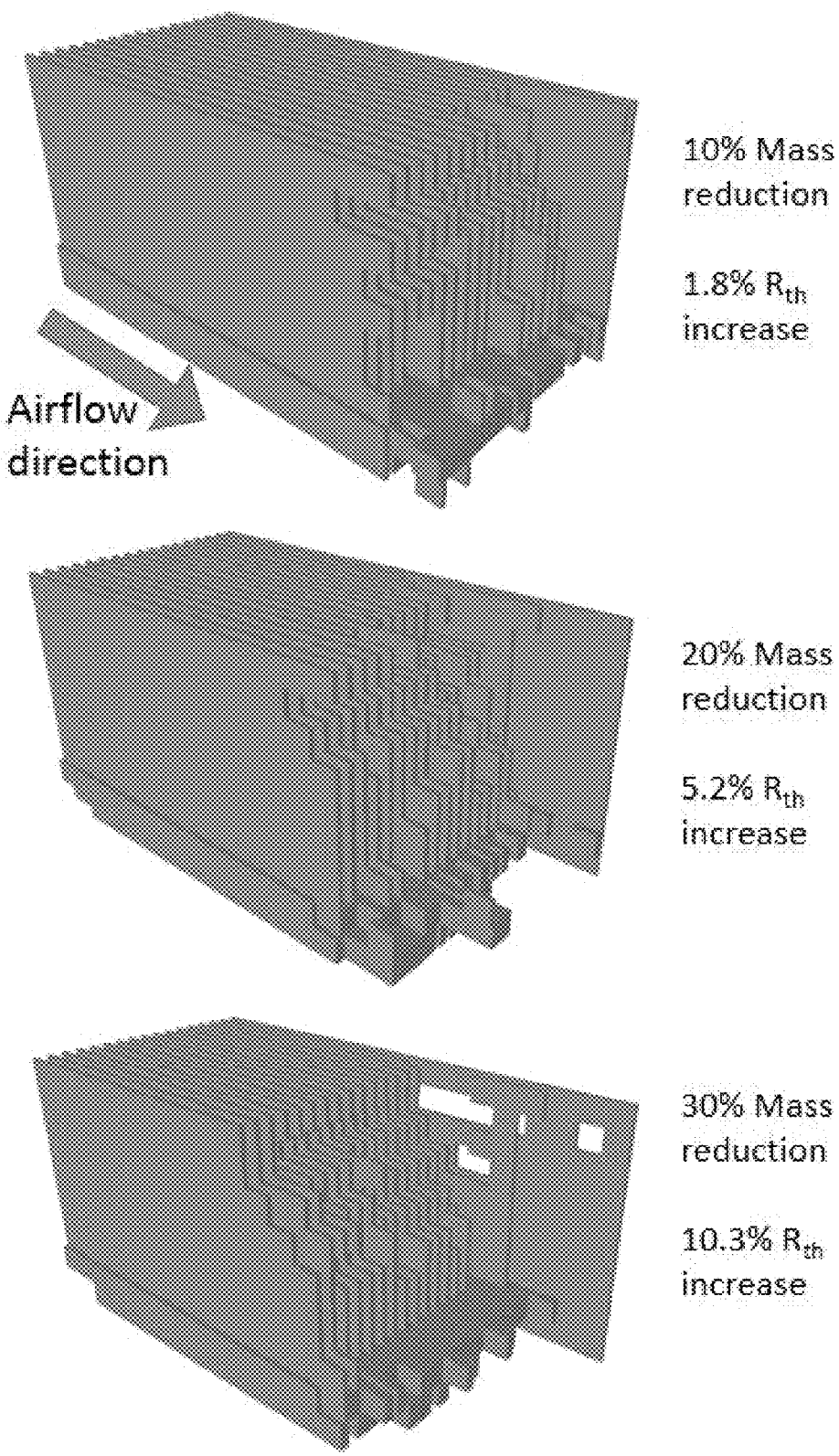
FIG. 9 illustrates an example of heat sink geometry at certain snapshots in the unrestricted subtractive design process performed in the forced convection computational wind tunnel shown in FIG. 7.
Figure 10:
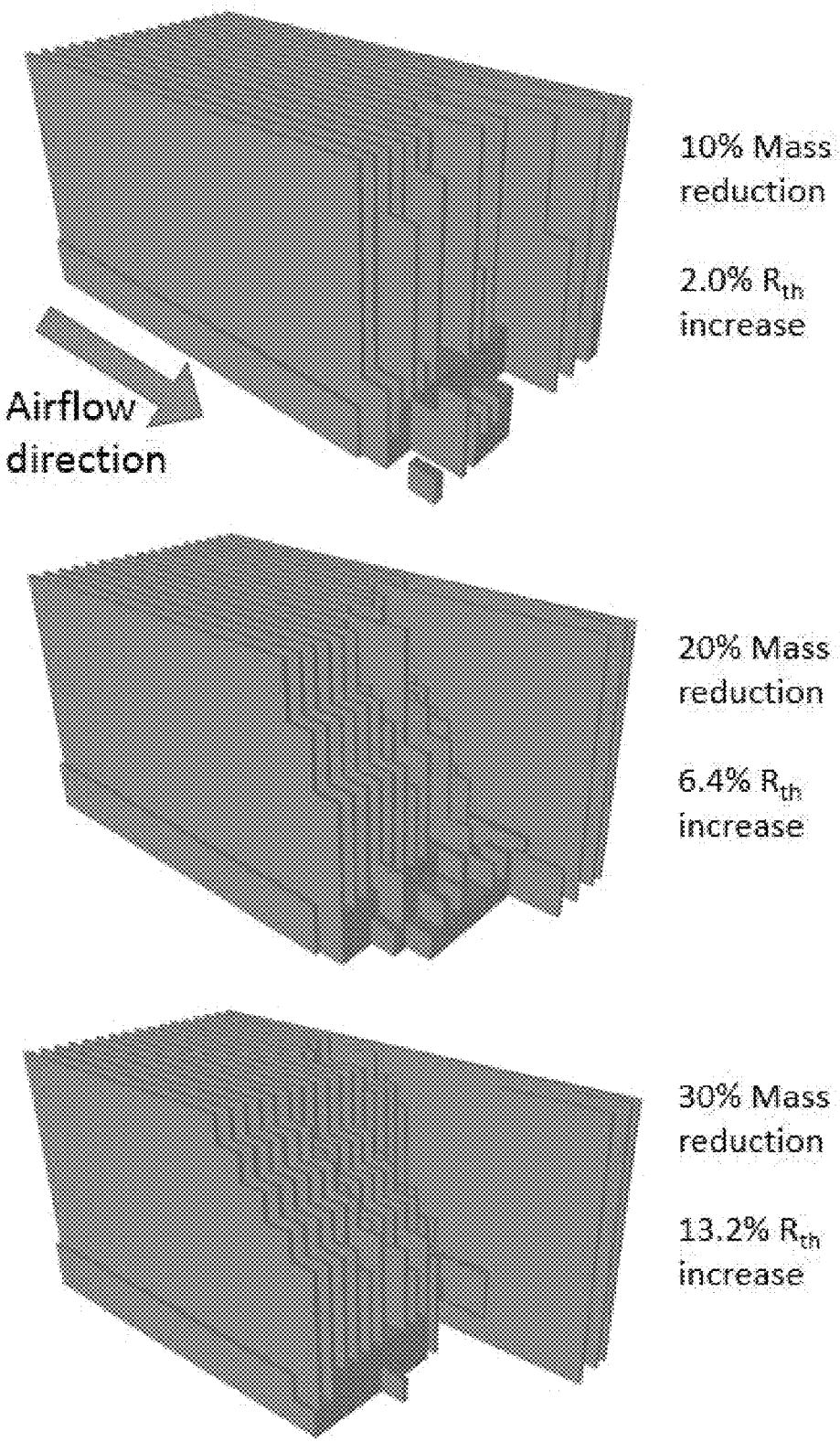
FIG. 10 illustrates an example of heat sink geometry at certain snapshots in the constrained top surface subtractive design process performed in the forced convection computational wind tunnel shown in FIG. 7.

The heat sink geometry at certain snapshots in the unrestricted mass removal process are shown in FIG. 9, namely at 10%, 20% and 30% mass reductions. Corresponding snapshots are shown for the constrained top surface removal process in FIG. 10.

Figure 11:
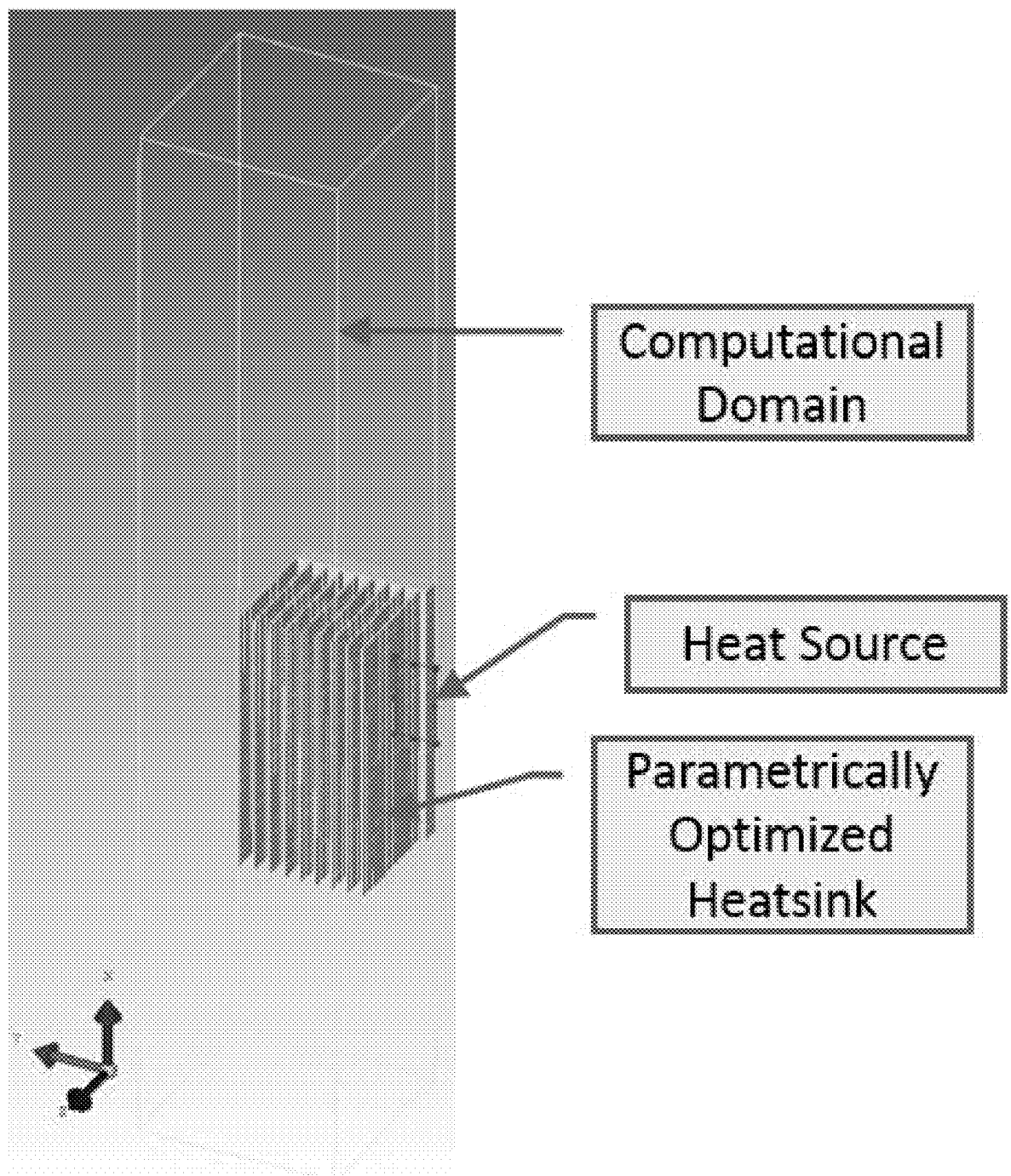
FIG. 11 illustrates an example of a parametrically optimized heat sink in a natural convection cooling environment.

The heat sink in a natural convection cooling environment as illustrated in FIG. 11 is similarly simulated, including the effects of radiative heat transfer. Symmetry is again utilized so that only half the heat sink is simulated.

Figure 12:
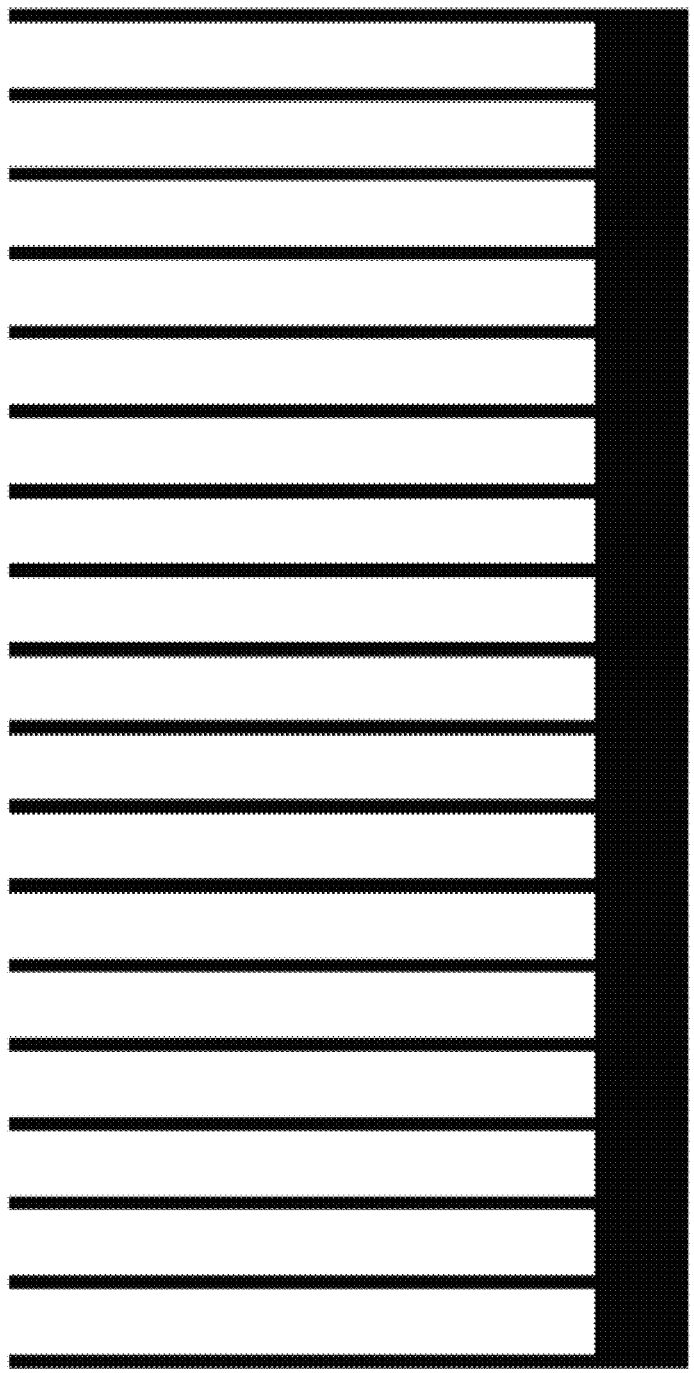
FIG. 12 illustrates an example of a heat sink design determined from a gradient based optimization process using the natural convection environment shown in FIG. 11.

Ambient temperature, material properties and heat sink design volume is the same as the forced convection study but the starting point heat sink is determined from a separate gradient based optimization study using the natural convection environment. This resulted in a heat sink as shown in FIG. 12 with an $R_{th}$ of 0.839° C./W.

Figure 13:
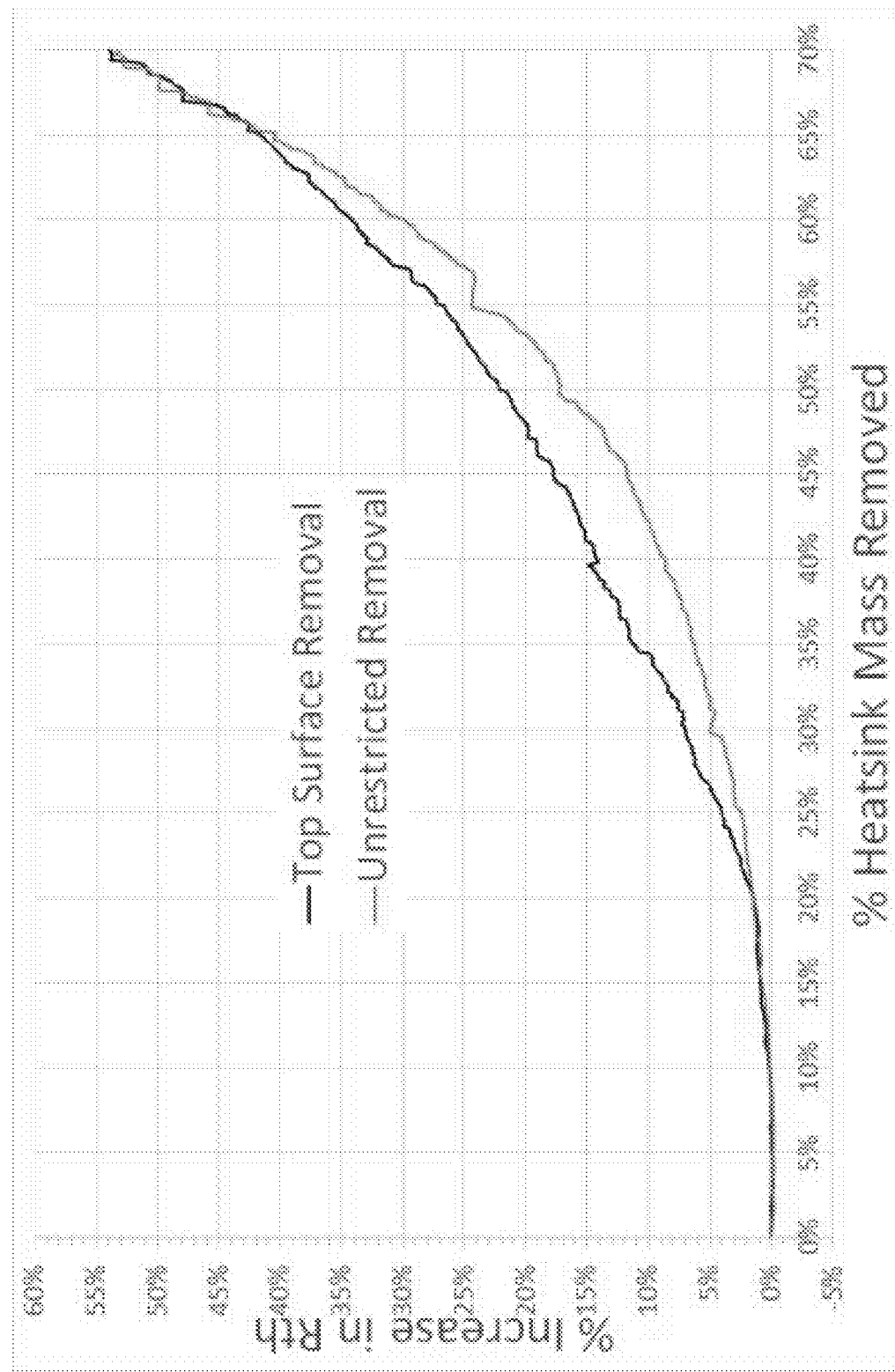
FIG. 13 illustrates an example of the relationship between the amount of removed heat sink mass and the resulting increase in thermal resistance ($R_{th}$) for a subtractive design process performed on the heat sink shown in FIG. 12 in the natural convection environment shown in FIG. 11.

The same unrestricted and top surface mass removal process is repeated for the natural convection cooled heat sink. The relationship between the amount of removed heat sink mass and the resulting increase in $R_{th}$ is shown in FIG. 13.

Figure 14:
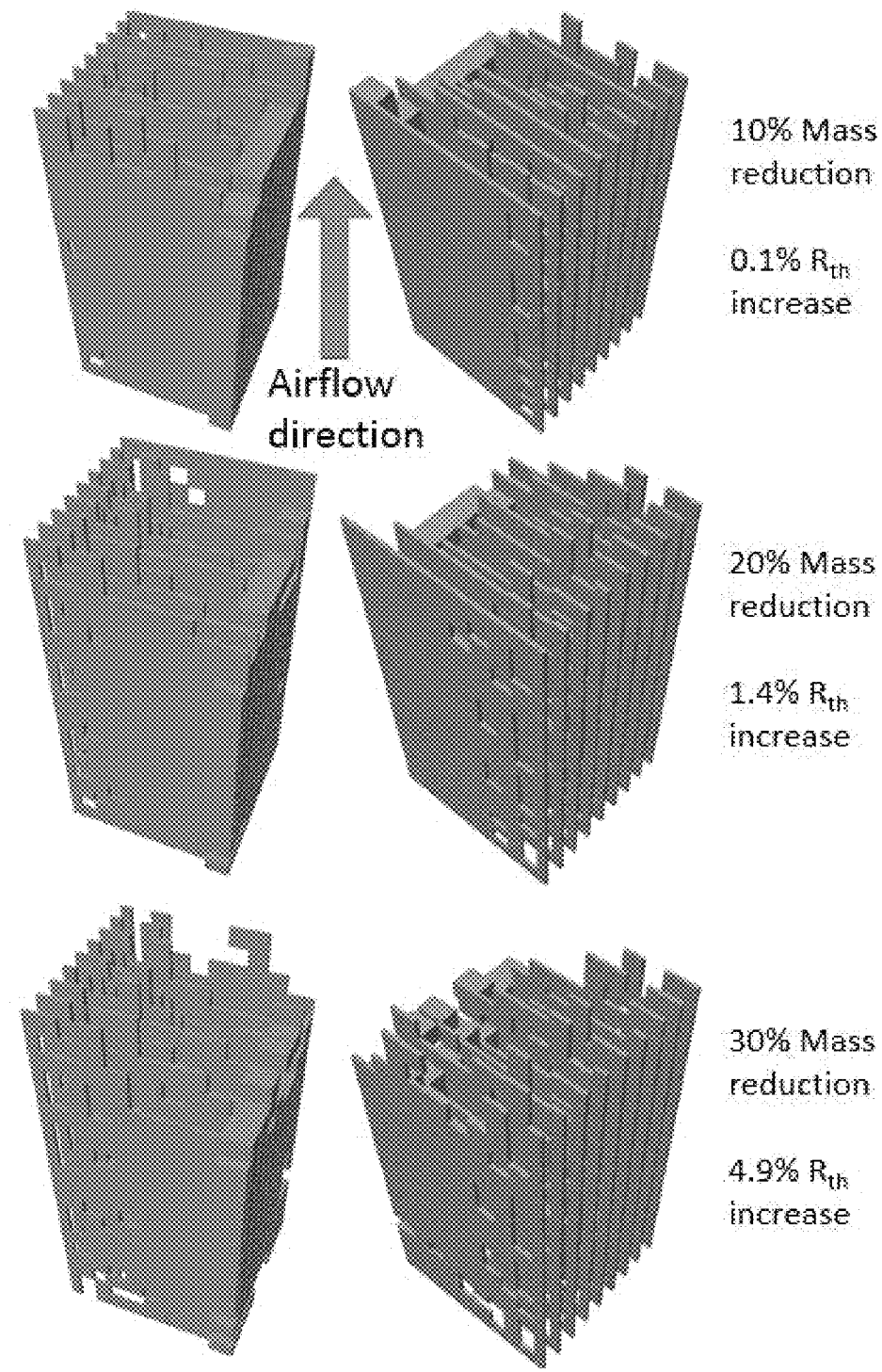
FIG. 14 illustrates an example of heat sink geometry at certain snapshots in the unrestricted subtractive design process performed in the natural convection environment shown in FIG. 11.
Figure 15:
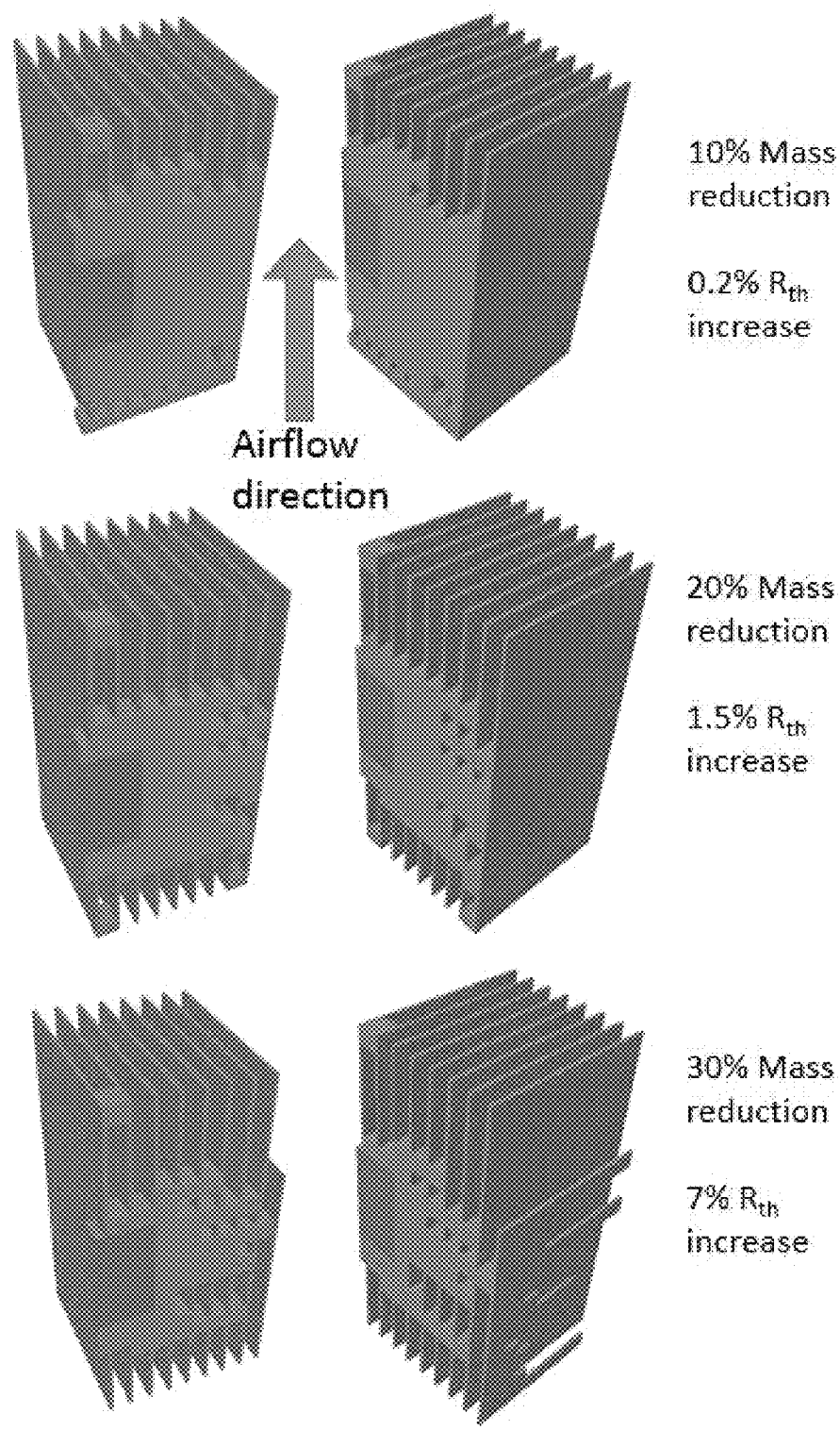
FIG. 15 illustrates an example of heat sink geometry at certain snapshots in the constrained top surface subtractive design process performed in the natural convection environment shown in FIG. 11.

The heat sink geometry at certain snapshots in the unrestricted mass removal process are shown in FIG. 14, namely at 10%, 20%, and 30% mass reductions. Similar snapshots are shown for the constrained top surface removal process in FIG. 15.

Figure 16:
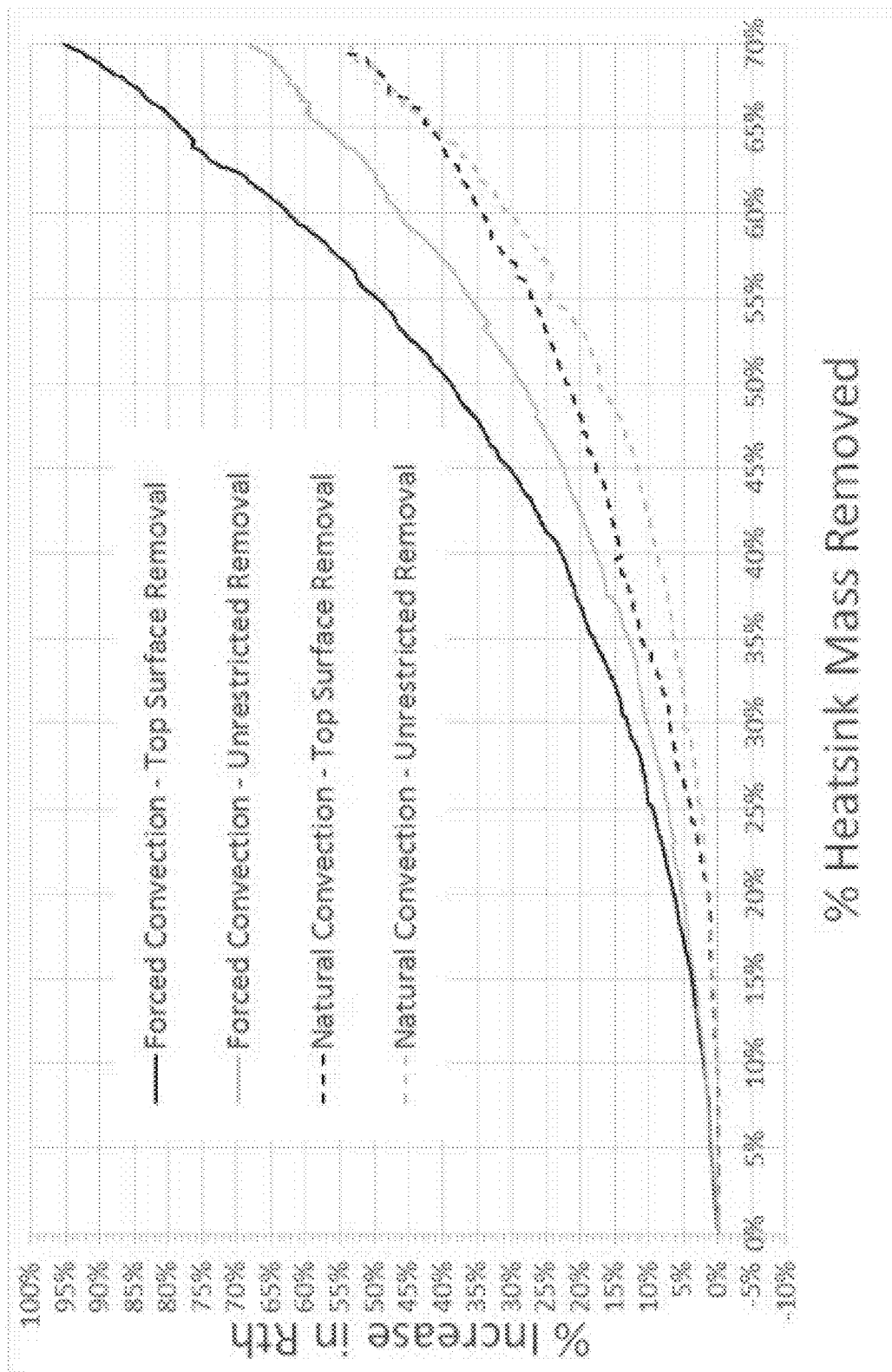
FIG. 16 illustrates a comparison of unrestricted and top surface removal approaches for both natural and forced convection cooled environments.

For natural convection cooled heat sinks there exists a much bigger opportunity to reduce the mass without unduly effecting the thermal performance of the heat sink compared to heat inks designed to operate in forced convection environments. This is especially true for the initial mass removal where, up to 15% mass removed, there is almost no increase in $R_{th}$ for the natural convection heat sink (FIG. 16).

In fact, there is actually a slight decrease in $R_{th}$ up to 9% mass removal, regardless of whether the mass is removed from any location, or from the top downwards. This may be due to the decrease in surface area resulting in an increase in (natural convection) flow rates through the fins that outweighs the loss in surface required for effective convective and radiative heat loss.

Such behavior is not true for the (fixed approach velocity) forced cooled heat sink. The loss in surface area dominates the reduction in convective heat loss effectiveness and is removed from the downwind side of the heat sink where the reduction in geometry has little effect on fin channel and bypass flow rates.

As expected, allowing heat sink mass to be removed from any location results in a delayed increase in $R_{th}$ compared to constraining the removal from the top downwards.

Figure 17:
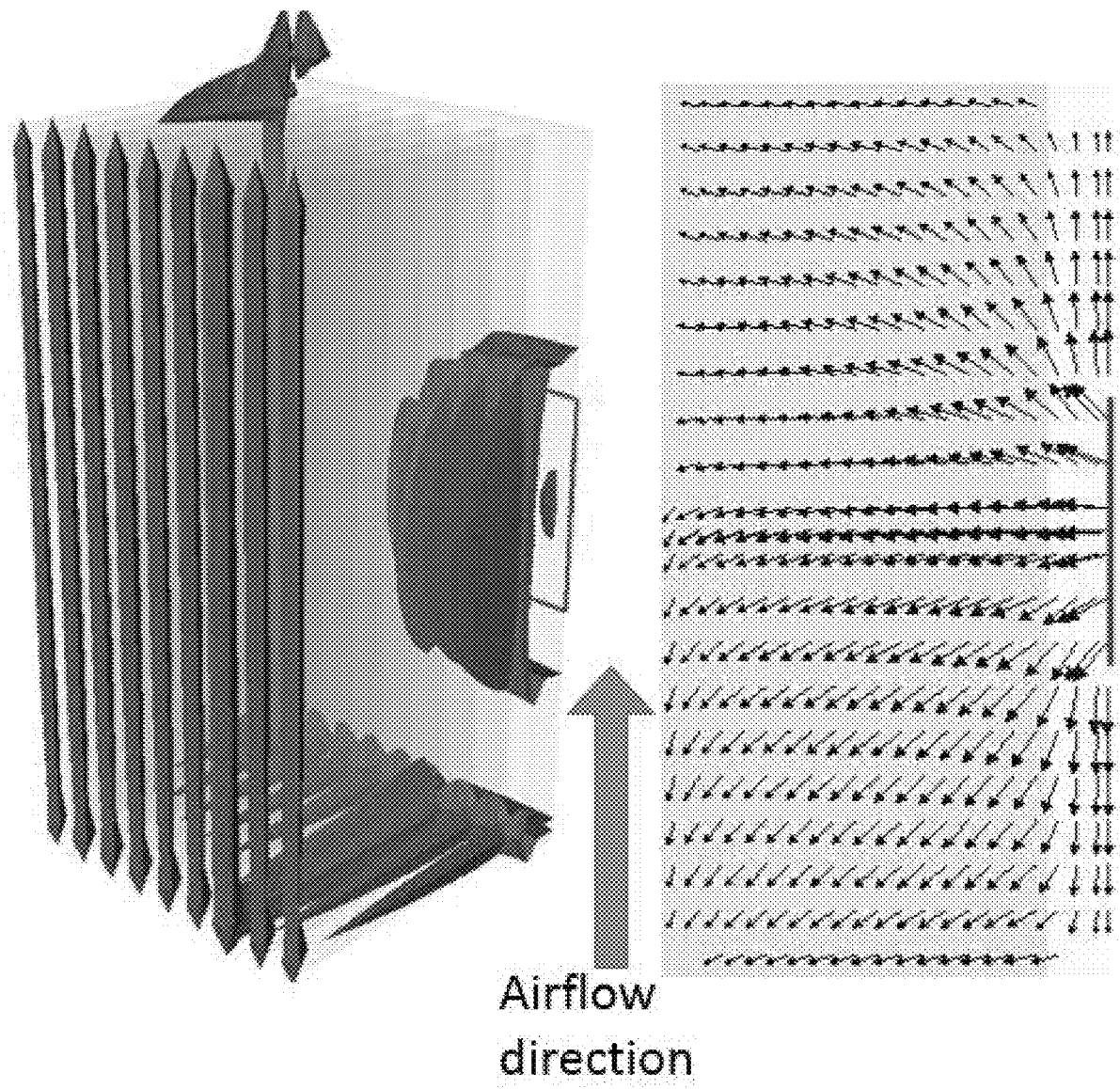
FIG. 17 illustrates that heat flow tends to the cooler windward portion of the heat sink where heat transfer is most effective due to the as yet unheated surrounding air. (High thermal bottleneck isosurface (red) and central fin heat flux vectors (black, low values not shown) for natural convection cooled heat sink).
Figure 18:
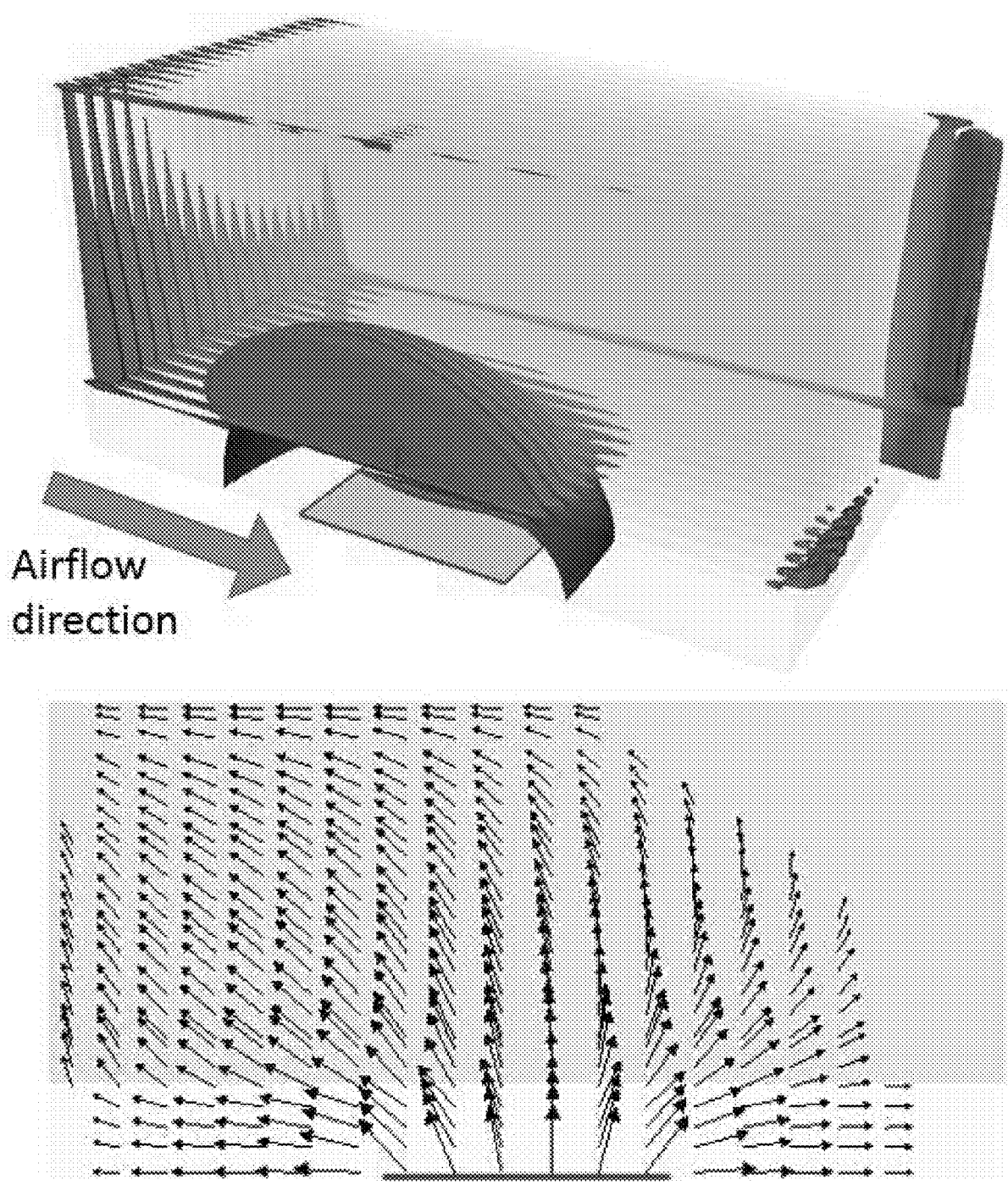
FIG. 18 illustrates that heat flow tends to the cooler windward portion of the heat sink where heat transfer is most effective due to the as yet unheated surrounding air. (High thermal bottleneck isosurface (red) and central fin heat flux vectors (black, low values not shown) for forced convection cooled heat sink).

Those parts of the heat sink that are removed early on by this subtractive process are those that contribute least to the cooling ability of the heat sink. In both forced and natural convection environments the central portion of the heat sink at the downwind (trailing) face is least effective and removed first. The heat flow tends to the cooler windward portion of the heat sink where heat transfer is most effective due to the as yet unheated surrounding air as illustrated in FIG. 17, especially for the forced convection case as illustrated in FIG. 18. The heat sink at the downwind side carries relatively little heat flow and can, and is, removed with little effect on thermal performance.

In both cooling environments it is evident that the outer fin may play a more important role in the thermal behavior as it persists for longer during the mass removal process. This is especially true of the forced convection environment. The outer fin benefits from a greater, less heated, reserve of ambient air compared to the air flowing through the heat sink that is constrained and increasing in temperature as it progresses through the heat sink channels.

When the heat sink mass is allowed to be removed from any location, the formation of 'frame' fins can be seen in forced convection and especially natural convection environments as illustrated in FIG. 19.

Holes appear near the outer edges of the fin, where the heat flow is reduced compared to closer to the base. The holes serve to increase the local surface area of the fin by introducing more edges, preserving the outer edges where there is already such a locally increased surface area. For the forced convection cooled heat sink these holes appear in multiple fins at the same location (ringed in the FIG. 17), giving rise to the potential to machine such a configuration as a final manufacturing stage.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic or mechanical computer-aided engineering (CAE) design processes, it should be appreciated that various examples of the disclosed technology may be implemented using any desired combination of electronic or mechanical design processes.

What is claimed is:

1. A method, executed by at least one processor of a computer, comprising:
   performing a thermal simulation to determine thermal property values for a heat sink design, wherein the thermal property value of a portion of the heat sink design relates to the portion's contribution to thermal performance of the heat sink design;
   removing one or more portions of the heat sink design to generate a new heat sink design, wherein the one or more portions of the heat sink design are selected based on the thermal property values and contribute less to the thermal performance of the heat sink design than remaining portions of the heat sink design eligible to be removed; and
   repeating the performing operation and the removing operation on new heat sink designs generated from the removing operation until a predetermined condition is satisfied, wherein the predetermined condition is that a threshold percentage of mass of the heat sink design has been removed,
   wherein the heat sink design is divided into tessellated portions, the thermal property value is determined for each of the tessellated portions, and the one or more portions removed in the removing operation are one or more of the tessellated portions.

2. The method recited in claim 1, wherein the thermal property values are thermal bottleneck values, wherein the thermal property value is defined as a dot product of a heat flux vector and a temperature gradient vector.

3. The method recited in claim 1, wherein the thermal property values are heat flux values or temperature gradient values.

4. The method recited in claim 1, wherein the one or more of the tessellated portions are selected only from certain portions of the heat sink design.

5. The method recited in claim 1, wherein the heat sink design is generated using an additive design approach.

6. One or more non-transitory computer-readable media storing computer-executable instructions that, when executed by one or more processors, cause a computing system to:
   perform a thermal simulation to determine thermal property values for a heat sink design, wherein the thermal property value of a portion of the heat sink design relates to the portion's contribution to thermal performance of the heat sink design;
   remove one or more portions of the heat sink design to generate a new heat sink design, wherein the one or more portions of the heat sink design are selected based on the thermal property values and contribute less to the thermal performance of the heat sink design than remaining portions of the heat sink design eligible to be removed; and
   repeat the performing operation and the removing operation on new heat sink designs generated from the removing operation until a determination that a predetermined condition is satisfied, wherein the predetermined condition is that a threshold amount of mass of the heat sink design has been removed,
   wherein the heat sink design is divided into tessellated portions, the thermal property value is determined for each of the tessellated portions, and the one or more portions removed in the removing operation are one or more of the tessellated portions.

7. The one or more non-transitory computer-readable media recited in claim 6, wherein the threshold amount of mass of the heat sink design comprises a maximum percentage of the heat sink design that can be removed.

8. The one or more non-transitory computer-readable media recited in claim 6, wherein the thermal property values are thermal bottleneck values, wherein the thermal property value is defined as a dot product of a heat flux vector and a temperature gradient vector.

9. The one or more non-transitory computer-readable media recited in claim 6, wherein the thermal property values are heat flux values or temperature gradient values.

10. The one or more non-transitory computer-readable media recited in claim 6, wherein the one or more of the tessellated portions are selected only from certain portions of the heat sink design.

11. The one or more non-transitory computer-readable media recited in claim 6, wherein the heat sink design is generated using an additive design approach.

12. A system, comprising:
    one or more processors, the one or more processors programmed to perform a method, the method comprising:
    performing a thermal simulation to determine thermal property values for a heat sink design, wherein the thermal property value of a portion of the heat sink design relates to the portion's contribution to thermal performance of the heat sink design;
    removing one or more portions of the heat sink design to generate a new heat sink design, wherein the one or more portions of the heat sink design are selected based on the thermal property values and contribute less to the thermal performance of the heat sink design than remaining portions of the heat sink design eligible to be removed; and
    repeating the performing operation and the removing operation on new heat sink designs generated from the removing operation until determination that a predetermined condition is satisfied, wherein the predetermined condition is that a threshold amount of mass of the heat sink design has been removed,
    wherein the heat sink design is divided into tessellated portions, the thermal property value is determined for each of the tessellated portions, and the one or more portions removed in the removing operation are one or more of the tessellated portions.

13. The system recited in claim 12, wherein the threshold amount of mass of the heat sink design comprises a maximum percentage of the heat sink design that can be removed.

14. The system recited in claim 12, wherein the thermal property values are thermal bottleneck values, wherein the thermal property value is defined as a dot product of a heat flux vector and a temperature gradient vector.

15. The system recited in claim 12, wherein the one or more of the tessellated portions are selected only from certain portions of the heat sink design.

16. The system recited in claim 12, wherein the heat sink design is generated using an additive design approach.

* * * * *